Dec. 4, 1962   M. R. JOHNSON   3,066,489
DUAL HYDRAULIC BRAKE SYSTEM
Filed May 8, 1961   2 Sheets-Sheet 1

Metzi R. Johnson
INVENTOR.

Dec. 4, 1962    M. R. JOHNSON    3,066,489
DUAL HYDRAULIC BRAKE SYSTEM
Filed May 8, 1961    2 Sheets-Sheet 2

Metzi R. Johnson
INVENTOR.

BY *Clarence A. O'Brien*
and *Harvey B. Jackson*
Attorneys

United States Patent Office 3,066,489
Patented Dec. 4, 1962

3,066,489
DUAL HYDRAULIC BRAKE SYSTEM
Metzi R. Johnson, 3635 E. Squire Ave., Cudahy, Wis.
Filed May 8, 1961, Ser. No. 108,401
1 Claim. (Cl. 60—54.6)

This invention relates to a novel and useful dual hydraulic brake system and more particularly to a dual hydraulic brake system adapted to enable two of the hydraulic brakes of a four wheeled vehicle to remain operative after a rupture or leak has developed in the hydraulic brake system servicing the other two hydraulic brakes.

While a major portion of the motor vehicles in operation today utilize hydraulic brake systems, the manufacturers of these vehicles have not provided a means for insuring at least partial operation of hydraulic brake systems in the event a leak or rupture develops in a portion of the system. When a rupture occurs in a conventional hydraulic brake system it is impossible to maintain enough hydraulic pressure in any one portion of the system in order to afford even partial braking. In conventional types of hydraulic braking systems utilized in motor vehicles being manufactured at this time a single master cylinder is provided and each of the hydraulic lines servicing the hydraulic wheel brakes is in direct communication with the single hydraulic system whereby should a rupture occur in any one of the wheel cylinders or the hydraulic line servicing those wheel cylinders substantially all pressure is lost within the hydraulic brake system thus rendering the system inoperative.

Certain manufacturers in the past have provided vehicles with both hydraulic and mechanical brakes whereby when the hydraulic braking system fails, the mechanical braking system may be relied upon to bring the vehicle to a stop. This arrangement of a dual braking system utilizing both hydraulic and mechanical operating means is quite expensive and accordingly, the manufacturers of low priced automobiles and other vehicles have not considered the added benefits sufficient to warrant the additional cost and servicing which would be required in a dual braking system of this type.

It is therefore the main object of this invention to provide a dual hydraulic brake system which may be readily incorporated into vehicles being manufactured at this time and also into existing vehicles at a relatively low cost.

A further object of this invention, in accordance with the immediately preceding object, is to provide a dual hydraulic braking system which will be capable of maintaining at least two hydraulic brakes of a vehicle in an operative condition for a length of time sufficient to enable the vehicle to be stopped safely several times in the event a rupture or substantial leak occurs in any one portion of the hydraulic brake system.

A still further object of this invention is to provide a means whereby even a portion of the braking system having a slow leak therein may be maintained operative for short periods of time.

A further object of this invention is to provide a dual hydraulic brake system which will separately control the braking of the forward pair of wheel brakes and the rear pair of wheel brakes so that in the event the braking system servicing either pair of these brakes is rendered inoperative, the remaining pair of wheel brakes will be capable of evenly distributing the braking power effected thereby to both sides of the vehicle, whereby the vehicle may be readily brought to a safe stop.

A final object of this invention to be specifically enumerated herein is to provide a dual hydraulic brake system which will conform to conventional forms of manufacture, be of simple construction, and easy to install so as to provide a device that will be economically feasible, long lasting and capable of being easily installed by even amateur do-it-yourself mechanics.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
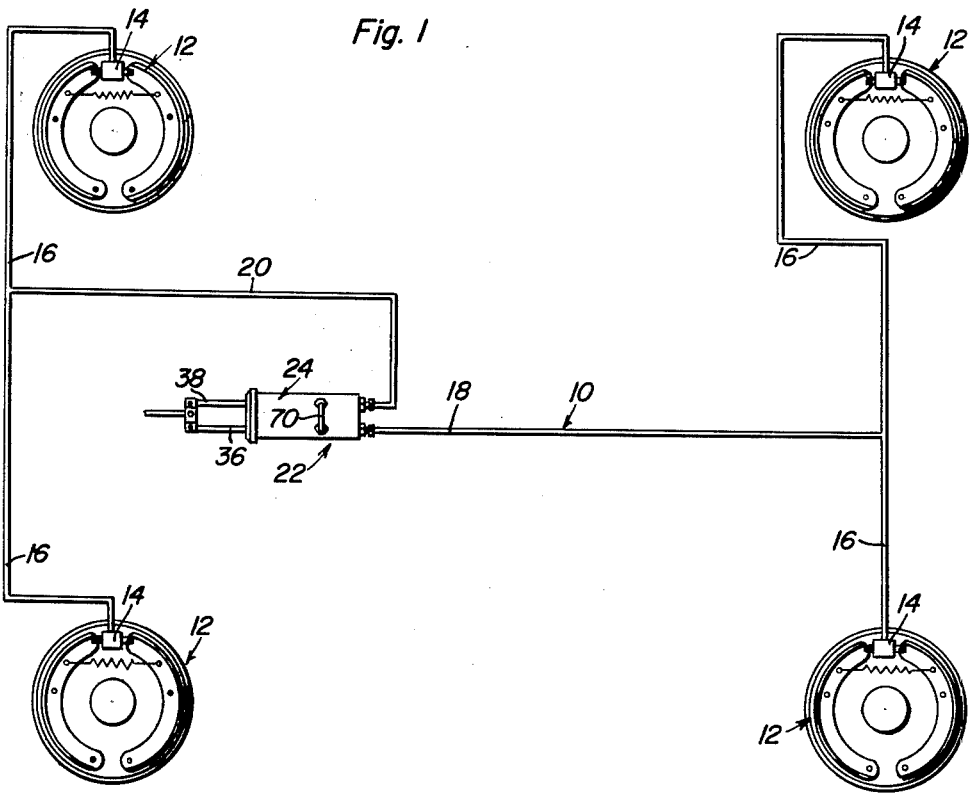
FIGURE 1 is a schematic view of a conventional type of hydraulic brake system utilized in a four wheeled vehicle, the dual master cylinder assembly of the instant invention being shown interposed therein.
Figure 5:
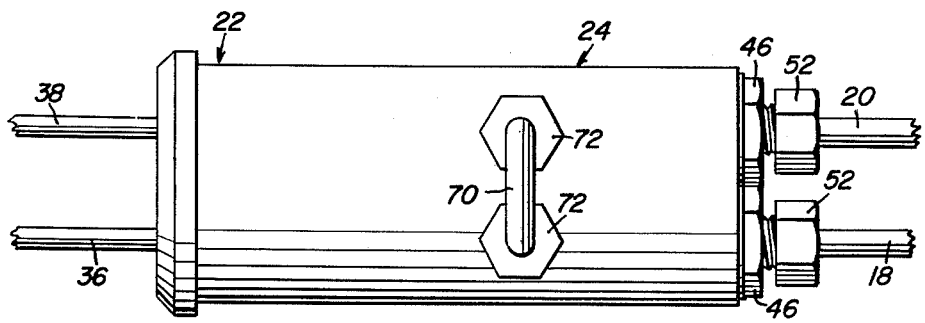
FIGURE 5 is a bottom plan view of the dual master cylinder assembly of the instant invention.
Figure 2:
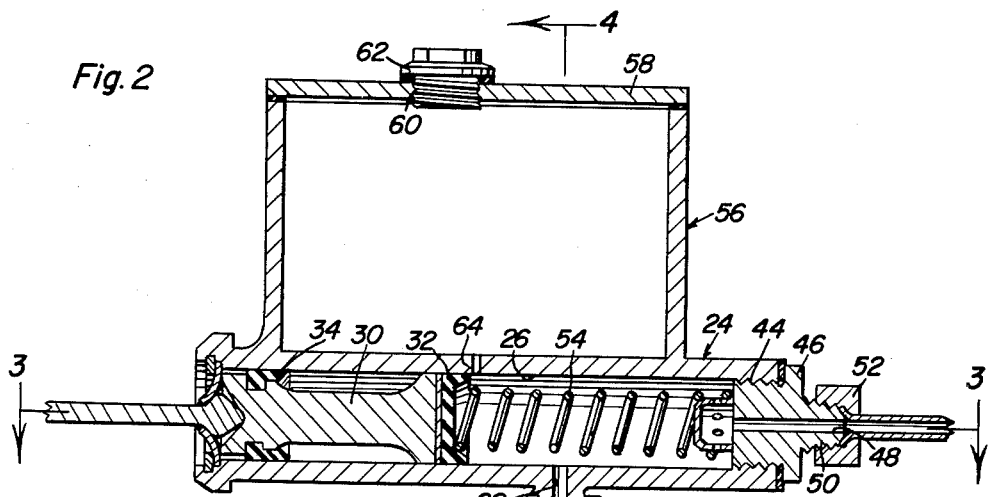
FIGURE 2 is an enlarged longitudinal vertical sectional view taken substantially through the center of the dual master cylinder assembly.
Figure 3:
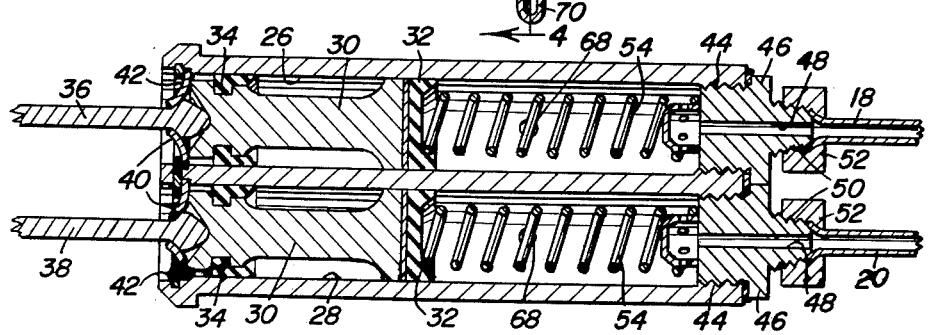
FIGURE 3 is a horizontal longitudinal sectional view taken substantially upon the plane indicated by the section line 3—3 of FIGURE 2.
Figure 4:
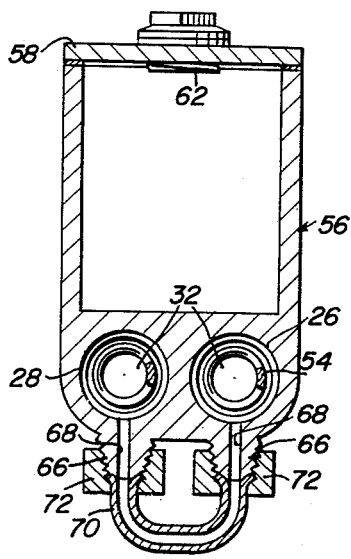
FIGURE 4 is a transverse vertical sectional view taken substantially upon the plane indicated by section line 4—4 of FIGURE 2.

Referring now more specifically to the drawings the numeral 10 generally designates the dual hydraulic brake system of the instant invention shown incorporated in a four wheeled vehicle.

The hydraulic brake system includes four wheel brake assemblies generally designated by the reference numeral 12, each of which is actuated by a wheel cylinder 14. Each of the wheel cylinders 14 has a hydraulic line 16 connected thereto at one end and one pair of the hydraulic lines 16 is connected to a main hydraulic line 18 while the other pair is connected to a main hydraulic line 20. The hydraulic lines 18 and 20 are in turn connected to the dual master cylinder assembly of the instant invention which is generally designated by the reference numeral 22.

In conventional hydraulic braking systems the systems are substantially the same with the exception being that the main lines 18 and 20 are connected by a T-fitting or the like which is in turn connected to a single master cylinder. With the type of conventional system, should a rupture develope in either of the main hydraulic lines the entire system is rendered inoperative and there is no portion of the braking system which may be actuated to bring the vehicle to a stop.

The dual master cylinder assembly 12 includes a cylinder member generally referred to by the reference numeral 24 which has a pair of cylinder bores 26 and 28 formed therein. Pistons 30 and 32 are slidably disposed within the bores 26 and 28 respectively and each are provided with a front sealing cup 32 and a rear seal 34.

The master cylinder assembly 22 is adapted to be actuated by a pair of actuating rods 36 and 38 which may comprise a part of the dual master cylinder assembly 24 or a part of the brake pedal linkage (not shown) of the vehicle in which the master cylinder assembly 24 is mounted. The rods 36 project through apertured boots 40 which are secured in the rear ends of the bores 26 and 28 by means of snap rings 42 and engage the rear ends of the pistons 30. The forward end of each of the bores 30 is internally threaded as at 44 and an outlet fitting 46 is threadedly engaged therein and has a longitudinal passage 48 formed therethrough. The outer end of each of the fittings 48 is provided with an externally threaded neck portion 50 upon which a threaded fastener 52 is secured in order to sealingly secure the adjacent ends of the hydraulic lines 18 and 20 to the dual master cylinder assembly 24 in communication with the bores 26 and 28 respectively therein. A compression spring 54 is disposed between the fitting 46 and the sealing cup 32 in each of the bores 26 and 28 to resiliently urge the pistons 30 to the rear end of the bores or cylinders 26 and 28.

A fluid reservoir generally referred to by the reference numeral 56 is formed integrally with the cylinder member 24 and is disposed uppermost thereon above the bores 26 and 28. The top wall 58 of the fluid reservoir is provided with a threaded opening 60 in which a closure plug 62 is removably secured. A pair of vertical passage means in the form of bores 64 communicate the interior of the fluid reservoir 56 with the bores 26 and 28 and the cylinder member 24 is provided with a pair of depending externally threaded nipples 66 having bores 68 formed therein which are communicated by means of a U-shaped connecting tube 70 whose opposite ends are secured to the nipples 66 by means of threaded fasteners 72.

It will be noted that the bores 64 communicate the interior of the liquid reservoir 56 with the interior of the bores 26 and 28 at points spaced slightly forward of the forward ends of the pistons 30 when they are in their rearmost positions. The bores 68 however are spaced forwardly of the bores 64 and communicate the interior of the bore 26 with the bore 28 at points in those bores spaced slightly less than half the distance between the pistons 30 and the fittings 46 when the pistons 30 are in their rearmost position.

In operation, should a leak occur in any one of the lines 18 and 20 or one of the lines 16, the cylinder bore servicing that line will have considerably reduced hydraulic pressure therein upon actuation of the dual master cylinder assembly 22 if the leak is substantial. However, although the bores 26 and 28 are communicated by means of the bores 68, after the pistons 30 are moved forward past the bores 68, the communication between the bores 26 and 28 is terminated and the bore of the dual master cylinder assembly 22 servicing the undamaged half of the hydraulic brake system 10 will be capable of actuating the wheel cylinders 14 of that half of the system inasmuch as there will at that time be no leaks in communication with that portion of the system. In the event the leak in the damaged portion of the system is a small one the bore servicing that part of the system 10 will be able to maintain at least some pressure in that portion of the system to render it at least partially operative. It is to be understood that the rods 36 and 38 will be actuated by a single actuating rod having a lever arm pivoted thereto at its mid portion and connected to the rods 36 and 38 at its outer ends whereby one piston 30 will be able to move a greater distance than the other piston in the event a leak occurs in that portion of the system 10 serviced by the forwardmost piston 30. Each time the rods 36 and 38 are moved forwardly of the dual hydraulic master cylinder assembly 22, the forward movement of the pistons 30 will tend to equalize the supply of fluid entrapped within the bores 26 and 28 until the forward ends of the pistons 30 register with the bores 68. Each time the pistons 30 are positioned in the rear portion of the bores 26 and 28 in the event a leak has occurred in a portion of the system 10 fluid from within the fluid reservoir 58 will flow through the bore 68 in communication with the damaged portion of the system and into the cylinder of the dual master cylinder assembly 22 servicing that portion of the system. Thus, assuming that the hydraulic reservoir is full of fluid when a leak occurs in the system 10, by pumping the brakes the entire system may be maintained operative until such time as the fluid within the reservoir 56 is exhausted and the pistons 30 have been moved forward an amount sufficient to cover the bores 68 whereupon only the undamaged portion of the system 10 will be maintained operative.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

For use with a dual hydraulic brake system on a wheeled vehicle of the type having front and rear wheel hydraulic brake actuating cylinders, a dual master cylinder assembly including a pair of horizontally disposed cylinders having piston means disposed in each of said cylinders and means for urging each of said piston means to the rear of the corresponding cylinder, fluid outlet fittings on the front ends of said cylinders adapted for securement to hydraulic lines leading to said front and rear wheel hydraulic brake actuating cylinders, fluid reservoir means, means communicating said reservoir means with each of said cylinders forwardly of the piston means disposed in said cylinders when the piston means are in their rearmost positions in the rear ends of said cylinders, elongated passage means having opposite ends which each open through the bottom of the corresponding cylinder at a point spaced forwardly of said communicating means and rearwardly of the forward end of that cylinder, said passage means comprising a generally U-shaped connecting tube whose opposite ends open into the bottom of said cylinders at a point spaced slightly rearwardly of the intermediate portion of travel of the forward end of said piston means, said U-shaped connecting tube including a portion intermediate its opposite ends spaced below said cylinders an amount sufficient to assure there being little possibility that air entrapped in one of said cylinders could pass into the other of said cylinders by means of said passage means, said cylinder assembly comprising an integral cylinder member having a pair of horizontal bores formed therein comprising said cylinders, said fluid reservoir means comprising a reservoir integral with said cylinder member and disposed uppermost thereon above said bores, said communicating means comprising passage means communicating the lower portion of the interior of said reservoir with the uppermost portions of said bores.

References Cited in the file of this patent

UNITED STATES PATENTS

| | | |
|---|---|---|
| 1,707,781 | Blanchard | Apr. 2, 1929 |
| 2,857,584 | Gibson | Oct. 21, 1958 |